US011785461B2

(12) United States Patent
Ramic et al.

(10) Patent No.: US 11,785,461 B2
(45) Date of Patent: Oct. 10, 2023

(54) MULTI-FACTOR AUTHENTICATION AND ACCESS CONTROL IN A VEHICULAR ENVIRONMENT

(71) Applicant: GOOGLE LLC, Mountain View, CA (US)

(72) Inventors: Haris Ramic, San Francisco, CA (US); Victor Chan, Mountain View, CA (US); Vikas Gupta, Sunnyvale, CA (US); Lingjun Li, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/978,479

(22) Filed: Nov. 1, 2022

(65) Prior Publication Data
US 2023/0052913 A1    Feb. 16, 2023

Related U.S. Application Data

(63) Continuation of application No. 17/064,224, filed on Oct. 6, 2020, now Pat. No. 11,528,605, which is a
(Continued)

(51) Int. Cl.
*H04W 12/06*    (2021.01)
*H04W 4/40*    (2018.01)
(Continued)

(52) U.S. Cl.
CPC ......... *H04W 12/06* (2013.01); *H04L 63/0853* (2013.01); *H04L 63/0861* (2013.01);
(Continued)

(58) Field of Classification Search
CPC ....... H04W 12/06; H04W 4/40; H04W 12/08; H04L 63/0853; H04L 63/0861; H04L 63/0876; H04L 63/107; H04L 2463/082
See application file for complete search history.

(56) References Cited

U.S. PATENT DOCUMENTS

| 6,100,603 A | 8/2000 | Gold |
| 9,082,239 B2 * | 7/2015 | Ricci ................. G06F 16/25 |

(Continued)

FOREIGN PATENT DOCUMENTS

| JP | 2004354930 | 12/2004 |
| JP | 2007107377 | 4/2007 |

(Continued)

OTHER PUBLICATIONS

European Patent Office; Communication pursuant to Article 94(3) issued in Application No. 20195247.0, 8 pages, dated May 19, 2022.
(Continued)

*Primary Examiner* — Mohamed Barakat
(74) *Attorney, Agent, or Firm* — Gray Ice Higdon

(57) ABSTRACT

The systems and methods described herein can include a digital assistant application that receives sensor signals from sensors installed in a vehicle and determines an entry event into the vehicle. The digital assistant application can receive, responsive to the entry event into the vehicle, a plurality authentication input signals from a plurality of sensors associated with the vehicle. The digital assistant application can determine a plurality of authentication states based on the plurality of authentication input signals and a plurality of authentication credentials. The digital assistant application can identify an access permission level of a plurality of access permission levels based at least in part on the plurality of identifies authentication states. The digital assistant application can identify, responsive to the access permission level, a subset of a set of functionalities available via the vehicle, and provide vehicular access to the subset of functionalities.

19 Claims, 4 Drawing Sheets

Related U.S. Application Data continuation of application No. 16/611,144, filed as application No. PCT/US2017/054848 on Oct. 3, 2017, now Pat. No. 10,812,976.

(51) Int. Cl.
*H04L 9/40* (2022.01)
*H04W 12/08* (2021.01)

(52) U.S. Cl.
CPC ........ *H04L 63/0876* (2013.01); *H04L 63/107* (2013.01); *H04W 4/40* (2018.02); *H04W 12/08* (2013.01); *H04L 2463/082* (2013.01)

(56) References Cited

U.S. PATENT DOCUMENTS

| | | |
|---|---|---|
| 9,769,658 B2 | 9/2017 | Dolev et al. |
| 10,074,223 B2 | 9/2018 | Newman |
| 10,271,265 B2 | 4/2019 | Breaux, III et al. |
| 10,812,976 B2 | 10/2020 | Ramic et al. |
| 2006/0294393 A1 | 12/2006 | McCall |
| 2008/0306656 A1* | 12/2008 | Baumann ............ B60N 2/0248 701/45 |
| 2013/0204466 A1 | 8/2013 | Ricci |
| 2014/0091903 A1 | 4/2014 | Birkel et al. |
| 2014/0094987 A1 | 4/2014 | Healey et al. |
| 2015/0077237 A1 | 3/2015 | Chou et al. |
| 2015/0077327 A1 | 3/2015 | Pisz et al. |
| 2015/0145648 A1 | 5/2015 | Winkelman |
| 2016/0176372 A1 | 6/2016 | Kim |
| 2016/0300050 A1 | 10/2016 | Hecht et al. |
| 2017/0237301 A1 | 8/2017 | Elad et al. |
| 2017/0357980 A1 | 12/2017 | Bakun |
| 2018/0012433 A1 | 1/2018 | Ricci |
| 2018/0041584 A1* | 2/2018 | Shannir ........... H04M 1/724098 |
| 2018/0050664 A1* | 2/2018 | Tarte ...................... B60R 25/31 |
| 2018/0072190 A1* | 3/2018 | Kowalski .............. H04W 12/06 |
| 2018/0316671 A1 | 11/2018 | Brown |
| 2021/0021999 A1 | 1/2021 | Ramic et al. |

FOREIGN PATENT DOCUMENTS

| | | |
|---|---|---|
| JP | 2009025715 | 2/2009 |
| JP | 2016029566 | 3/2016 |
| JP | 2016161754 | 9/2016 |
| JP | 2017001615 | 1/2017 |
| JP | 2017090613 | 5/2017 |
| JP | 2015529168 | 10/2021 |
| KR | 20160113247 | 9/2016 |
| WO | 2016032990 | 3/2016 |

OTHER PUBLICATIONS

Japanese Patent Office; Notice of Allowance issued in Application No. JP2020-169803; 3 pages; dated Feb. 14, 2022.

Intellectual Property of India; Hearing Notice issued in Application No. 201927051103; 2 pages; dated Apr. 5, 2022.

The Korean Intellectual Property Office; Notice of Allowance issued in Application No. 10-2021-7007577; 3 pages; dated Dec. 21, 2021.

Japanese Patent Office; Notice of Reasons for Rejection issued in Application No. 2020169803; 10 pages; dated Nov. 1, 2021.

China National Intellectual Property Administration; Notice of Allowance issued in Application No. 201780091950.1; 6 pages; dated May 6, 2021.

The Korean Intellectual Property Office; Notice of Office Action issued in Application No. 10-2021-7007577; 6 pages; dated Jun. 7, 2021.

European Patent Office; Communication issue Application No. 20195247.0; 10 pages; dated Dec. 2, 2020.

Intellectual Property India; Office Action issue in Application No. 201927051103; 6 pages; dated Jan. 27, 2021.

Korean Intellectual Property Office; Notice of Allowance issued in Application No. 1020207022335; 3 pages; dated Dec. 15, 2020.

China National Intellectual Property Administration: Office Action issued for Application No. 201780091950.1 dated Sep. 30, 2020.

Korean Intellectual Property Office; Notice of Allowance issued in Application No. 10-2019-7038224; 3 pages; dated May 4, 2020.

European Patent Office; Intention to Grant of EP Ser. No. 17785129.2; 56 pages; dated Apr. 22, 2020.

European Patent Office; International Preliminary Report on Patentability of Ser. No. PCT/US2017/054848; 23 pages; dated Sep. 2, 2019.

European Patent Office; International Search Report and Written Opinion of Ser. No. PCT/US2017/054848; 12 pages; dated Dec. 4, 2017.

Japanese Patent Office; Notice of Reasons for Rejection issued in Application No. 2022040263; 9 pages; dated Jan. 30, 2023.

Intellectual Property India; Examination Report issue in Application No. 202228023072; 6 pages; dated Feb. 23, 2023.

Japanese Patent Office; Decision of Rejection issued in Application No. 2022040263; 4 pages; dated May 15, 2023.

* cited by examiner

MULTI-FACTOR AUTHENTICATION AND ACCESS CONTROL IN A VEHICULAR ENVIRONMENT

BACKGROUND

Unsecured or improperly secured vehicles can be susceptible to unauthorized access or use. Keys or hardware entry systems may not prevent some forms of unauthorized access or use to a vehicle.

SUMMARY

According to an aspect of the disclosure, a system for multi-factor entry authentication of vehicle entry events. The system can include a data processing system having a digital assistant application that includes an entry detection component, an entry authentication component, and an access control component. The digital assistant application can execute in a vehicle to have the entry detection component receive at least one sensor signal obtained by a first sensor installed in the vehicle. The entry detection component can determine, based on the at least one sensor signal, an entry event into the vehicle. The entry event can be indicative of a user entering the vehicle. The entry authentication component can receive, responsive to the entry event into the vehicle, a first authentication input signal and a second authentication input signal from at least a second sensor associated with the vehicle. The entry authentication component can determine a first authentication state based on the first authentication input signal and a first authentication credential from a plurality of authentication credentials. The entry authentication component can determine a second authentication state based on the second authentication input signal and a second authentication credential of the plurality of authentication credentials. The access control component can identify an access permission level of a plurality of access permission levels based at least in part on the first authentication state and the second authentication state. The access control component can identify, responsive to the access permission level, a subset of a set of functionalities available via the vehicle. The digital assistant application can provide vehicular access to the subset of functionalities and an audio output signal related to at least one subset of the functionalities.

According to an aspect of the disclosure, a method of multi-factor entry authentication of vehicle entry events. The method can include receiving, by a data processing system including a digital assistant, at least one sensor signal obtained by a first sensor installed in the vehicle. The method can include the data processing system determining, based on the at least one sensor signal, an entry event into the vehicle. The entry event can be indicative of a user entering the vehicle. The method can include the data processing system receiving, responsive to the entry event into the vehicle, a first authentication input signal and a second authentication input signal. The first authentication input signal and the second authentication input signal can be obtained by at least a second sensor associated with the vehicle. The method can include the data processing system determining a first authentication state based on the first authentication input signal and a first authentication credential from a plurality of authentication credentials. The method can include the data processing system determining a second authentication state based on the second authentication input signal and a second authentication credential of the plurality of authentication credentials. The method can include the data processing system identifying an access permission level of a plurality of access permission levels based at least in part on the first authentication state and the second authentication state. The method can include the data processing system identifying, responsive to the access permission level, a subset of a set of functionalities available via the vehicle. The method can include the data processing system providing vehicular access to the subset of functionalities.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
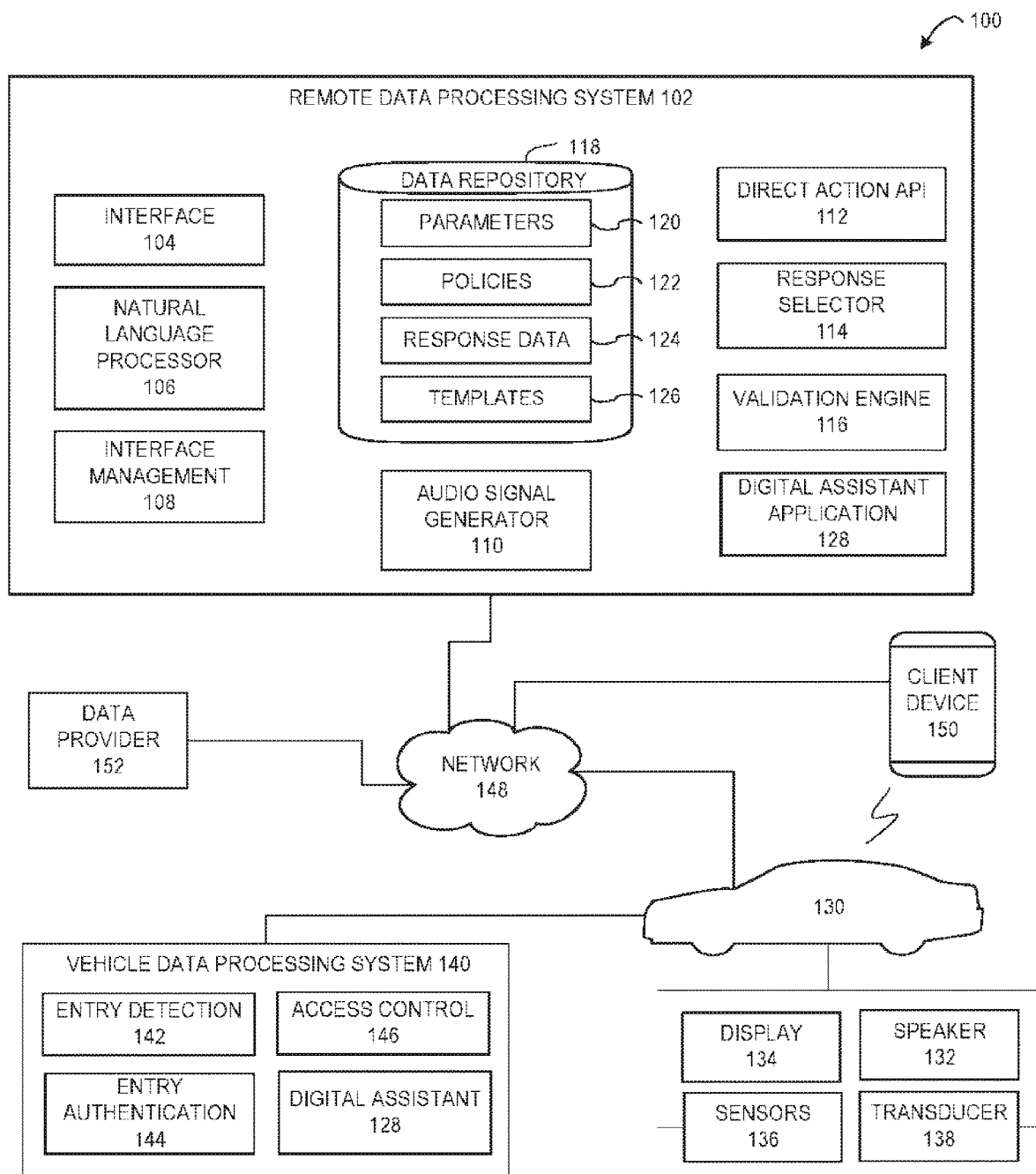
FIG. 1 illustrates an example system to authenticate users and control user access to functionalities available through vehicles based on a plurality of access permission levels.

Following below are more detailed descriptions of various concepts related to, and implementations of, methods, apparatuses, and systems for multi-factor user authentication and control of user access to functionalities associated with a vehicle environment. The various concepts introduced above and discussed in greater detail below may be implemented in any of numerous ways.

The present disclosure is generally directed to methods and systems for entry authentication of vehicle entry events and access control in a vehicle environment. While in-vehicle features based on electronic and information technology (IT) systems can improve user experience, such in-vehicle features can also lead to other risks and technical challenges. In-vehicle online connectivity or the availability of in-car entertainment (ICE) systems (also referred to as in-vehicle infotainment (IVI) systems) can result in frequent driver distractions and increase the risk of accidents. Users' attempts to initiate or respond to communications (e.g., emails, messages, or phone calls), search or access multimedia files for rendering on IVI systems, or initiate online actions (e.g., online shopping or online reservations) while driving can lead to serious and dangerous accidents.

Furthermore, given that vehicle connectivity to the Internet occurs mainly through wireless client devices, the increase in the range of in-vehicle IT features, e.g., to include access to online data, systems or applications, can put a strain on communication resources such as wireless networks' bandwidth. Furthermore, the dependency of a vehicle on a mobile device for connectivity can result in poor connectivity at relatively high speeds of the vehicle or as the vehicle moves away from coverage areas of wireless networks. The poor connectivity can lead to frequent interruptions in services or data accessed by the vehicle.

In addition, since vehicles can be shared, for example, among family members, friends, or even strangers (e.g., rental cars), the availability of in-vehicle features to access data or security-sensitive data or systems can jeopardize user privacy and data or users' security. For instance, a feature of remotely unlocking a home garage door via a vehicle can pose serious threats or dangers (e.g., crimes) to a user if such feature is made accessible to any driver or passenger of a vehicle. Some potential car features (such as automatic and remote vehicle door locking/unlocking or automatic and remote control of vehicle windows) can lead to concerns, for example, if not denied to passengers in a vehicle. Also, unrestricted access to data via the vehicle can increase the risk of publicly exposing that data.

In the current disclosure, a data processing system including a digital assistant application can allow for hands-free control of various functionalities associated with a vehicle. The digital assistant application can include a conversational digital assistant that provides interactive audio-based interactions with users in a conversational format. For example, users can talk to the digital assistant application, and the digital assistant application can (1) accurately interpret audio signals input from the users, (2) respond with audio output signals for playing to the users, (3) perform online tasks or actions identified from the audio input signals, or a combination thereof. For instance, a driver or passenger can audibly request the rendering of a multimedia file, the opening of a vehicle window, the locking or unlocking of vehicle doors, the adjustment of air conditioning within the vehicle, the unlocking or opening of a home garage door, or other functionalities available via the vehicle. The digital assistant application can recognize and cause execution of the requested functionality based on the audible request. By allowing for hands-free user interactions, the digital assistant application can allow for providing a variety of in-vehicle features without significant increase in the likelihood of drivers' distraction.

In order to avoid service disruptions due to potential poor connectivity, the digital assistant application (and the data processing system) can execute in the vehicle. Having the digital assistant application execute locally in the vehicle (e.g., within one or more electronic devices of the vehicle) allows the digital assistant application to be available to in-vehicle users regardless of vehicle connectivity status (e.g., to the Internet or to mobile devices). The digital assistant application can also store user-related data, such as playlists, multimedia files, user security credentials (e.g., login usernames, passwords, or passcodes for various services), user access permission levels to various services, or a combination thereof, locally can allow for access to such data independent of the connectivity status of the vehicle. The digital assistant application (and the data processing system) can execute in the vehicle, on a mobile device, or on a remote computer system (e.g., cloud), or a combination thereof. For example, various instances of the digital assistant application may execute on separate platforms.

The local (in the vehicle) storage and access of data calls for reliable user authentication (or vehicle entry authentication) and reliable data security measures. The data processing system (and the corresponding digital assistant application) of the current disclosure can employ multi-factor user authentication. As used herein, multi-factor authentication refers to authentication methods involving two or more authentication techniques based on two or more authentication data inputs (or authentication input signals). Also, the data processing system can maintain separate data accounts for separate users. The data processing system can encrypt the data accounts (or corresponding security sensitive data) to enhance data security. The data processing system (or the corresponding digital assistant application) can use the multi-factor authentication and predefined access permission levels to guarantee that no user gets access to functionalities or data beyond the permission access level(s) assigned to that user.

With user authorization, the data processing system (or the corresponding digital assistant application) may use non user distracting authentication techniques (e.g., not involving manual or substantial physical user involvement). For instance, fingerprints-based (or other biometrics based) authentication may involve substantial physical and mental efforts from users and may be more likely distracting to users, especially drivers. Also, other authentication techniques such as login usernames and passwords may not be adequate for audio input based authentication. When audibly provided, such authentication credentials can lose their secrecy and be exposed to other users in the vehicle during the authentication process. The data processing system (or the corresponding digital assistant application) may use authentication techniques not involving substantial physical action or effort from users, such as key fob authentication, authentication based on automatic acquisition of mobile device identifiers, face recognition, speaker recognition, or a combination thereof.

The systems and methods described herein can include a data processing system including a digital assistant application that receives at least one sensor signal obtained by a first sensor installed in a vehicle. The data processing system can determine, based on the at least one sensor signal, an entry event into the vehicle. The data processing system can receive, responsive to the entry event into the vehicle, a plurality authentication input signals from a plurality of sensors associated with the vehicle. The data processing system can determine a plurality of authentication states based on the plurality of authentication input signals and a plurality of authentication credentials. The data processing system can identify an access permission level of a plurality of access permission levels based at least in part on the plurality of identifies authentication states. The data processing system can identify, responsive to the access permission level, a subset of a set of functionalities available via the vehicle, and provide vehicular access to the subset of functionalities.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

FIG. 1 illustrates an example system 100 to authenticate users and control user access to functionalities available through vehicles based on a plurality of access permission levels. The system 100 can include at least one remote data processing system 102, one or more vehicles 130 (e.g., manual or autonomous cars, trucks, motorcycles, planes, boats, or other transport machines) each of which associated with a respective vehicle data processing system 140, and one or more mobile client devices 150 (e.g., smart phone, tablet, or smart watch). The system 100 can include a network 148 communicatively coupling the remote data processing system 102 to the one or more vehicles 130, the one or more mobile client devices 150, or a combination thereof. The system 100 can include one or more data providers 152 (or communication devices thereof) communicatively coupled to the remote data processing system 102, the one or more vehicles 130, the one or more mobile client devices 150, or a combination thereof via the network 148.

The remote data processing system 102 can include a cloud data processing system, an enterprise data processing system, a home data processing system, or a combination thereof. The remote data processing system 102 can include at least one server having at least one processor. For example, the remote data processing system 102 can include a plurality of servers located in at least one data center or server farm. The remote data processing system 102 can include multiple, logically grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The remote data processing system 102 can include servers in a data center that are stored in one or more high-density rack systems, along with associated storage systems, located for example in an enterprise data center. Each of the components of the remote data processing system 102 may include at least one processing unit, server, virtual server, circuit, engine, agent, appliance, or other logic device such as programmable logic arrays configured to communicate with the data repository 118 and with other computing devices.

The remote data processing system 102 can include an interface 104. The data processing system 102 can include a natural language processor (NLP) component 106 to parse audio-based inputs. The data processing system 102 can include an interface management component 108 to detect and manage the interfaces of other devices in the system 100. The remote data processing system 102 can include an audio signal generator component 110 to generate audio-based signals. The remote data processing system 102 can include a direction action application programming interface (API) 112. The remote data processing system 102 can include a response selector component 114 to select responses to audio-based input signals. The remote data processing system 102 can include a validation engine (or validation component) 116 to validate audio-based inputs received by the remote data processing system 102. The remote data processing system 102 can include a data repository 118 in which the data processing system 102 can store parameters 120, policies 122, response data 124, and templates 126. The remote data processing system 102 can include a digital assistant application (also referred to herein as a digital assistant system) 128 to handle and manage conversations with users of the vehicle(s) 130 or the mobile client device(s) 150 including performing tasks or actions requested by the users.

The interface 104 can enable communication between the components of the remote data processing system 102, communication between the remote data processing system 102 and devices or systems of the system 100, or a combination thereof. The interface 104 can be a data interface or a network interface that enables the components of the system 100 to communicate with one another. The interface 104 of the data processing system 102 can provide or transmit one or more data packets that include action data structures, audio signals, or other data via the network 148 to the mobile client device 150 or vehicle 130. For example, the data processing system 102 can provide the output signal from the data repository 118 or from the audio signal generator 110 to the mobile client device 150. The data processing system 102 can also instruct, via data packet transmissions, the mobile client device 150 or the vehicle 130 to perform the functions indicated in the action data structures. The output signal can be obtained, generated, transformed to or transmitted as one or more data packets (or other communications protocol) from the data processing system 102 (or other computing device) to the mobile client device 150 or the vehicle 130.

The NLP component 106 can receive input audio signals, for example, from the vehicle 130 or the mobile client device 150. The data processing system 102 can receive the input audio signal from the client device 128 or the vehicle 140. A user of the vehicle 130 or the mobile client device 150 can provide an audio input signal, and the vehicle 130 or the mobile client device 150 can transmit the audio input signal to the remote data processing system 102 for processing by the NLP component 106. The NLP component 106 can convert a received input audio signal into recognized text by comparing the input audio signal against a stored, representative set of audio waveforms and choosing the closest matches. The representative waveforms can be generated across a large set of audio signals, for example, from a plurality of individuals. Once the input audio signal is converted into recognized text, the NLP component 106 can match the text to words that are associated, for example, via a learning phase, with actions or output audio signals.

From the input audio signal, the NLP component 106 can identify at least one request from a user (e.g., a user of the vehicle 130 or a user of the mobile client device 150) or at least one trigger or hot keyword corresponding to the request. The NLP component 106 (or other component) may translate the input audio signal to a corresponding text signal, and identify the request based on the text signal. The request can indicate intent or subject matter of the input audio signal. The trigger keyword can indicate a type of action likely to be taken. For example, the NLP component 106 can parse the input audio signal to identify at least one request to open the vehicle's windows, skip to a next audio file in a music playlist, initiate a call, compose and send an message (e.g., email message or short message service (SMS) message), initiate a global positioning system (GPS) navigation to a specific address, access data stored locally or remotely, initiate a streaming session, initiate a client application, open or close a garage door, control a home related setting, or a combination thereof. The trigger keyword can include at least one word, phrase, root or partial word, or derivative indicating an action to be taken. For example, the trigger keywords "go" or "ok" or "hey."

The interface management component 108 can detect and manage the interfaces of other devices in the system 100, such as interface s of the vehicle(s) 130 and the mobile client device(s) 150. The response selector component 114 can generate a response for sending to the user associated with the identified request. For example, upon the NLP component 106 identifying the request or the trigger or hot keyword corresponding to the request, the response selector component 114 can access the data repository 118 to obtain information or content to generate a response for sending to the user. For example, the response selector component 114 can obtain a phrase, a content item, or a combination thereof from the response data 124 in the data repository 118.

The audio signal generator component 110 can generate or otherwise obtain an output audio signal for sending as part of the response to user. For instance, the audio signal generator component 110 can generate or select one or more audio signals associated, for example, with the phrase or the content item selected or obtained by the response selector component 114. For example, once a request is fulfilled, the signal generator component 110 can generate an audio output signal corresponding to the phrase "the action was completed."

The NLP component 106 can identify, based on the received input audio signal, a task or action (e.g., opening the vehicle's windows, skipping to a next audio file in a music playlist, initiating a call, composing and sending an message (e.g., email message or short message service (SMS) message), initiating a global positioning system (GPS) navigation to a specific address, accessing data stored locally or remotely, initiating a streaming session, initiating a client application, opening or closing a garage door, controlling a home related setting, or a combination thereof) to be performed by the remote data processing system 102, the vehicle 130, the mobile client device 150, or a combination thereof. Responsive to the identification of the task or action, the direct action API 112 of the remote data processing system 102 can generate one or more action data structures. The one or more action data structures can include data or instructions for the execution of the identified action or action to satisfy the request. The action data structure may be a JSON formatted data structure or an XML formatted data structure.

Depending on the identified action or task, the direct action API 112 can execute code or a dialog script that identifies the parameters required to fulfill the request. The digital assistant application 128 can include the one or more action data structures in a message to transmit to the vehicle 130, the client device 128, or the data provider 154. The digital assistant application 128 or the direct action API 112 can determine the destination of the message based on the request identified by the NLP component 106. For example, if an input audio signal includes "open a window," the NLP component 106 can identify the action word "open a window," and the digital assistant application 128 or the direct action API 112 can package the one or more action data structures into a response for transmission to the vehicle 130. The direction action API 112 can access a vehicle identifier (ID) or vehicle IP address from the response data 124 to determine which vehicle is associated with the user that generated the request. Upon receiving the one or more action data structures, the vehicle 140 can process the action data structure(s) and open the vehicle's window. If the input audio signal corresponds to "stream 'The Lion Prince' movie," the NLP component 106 can identify the action word "stream movie; The Lion Prince." The digital assistant application 128 or the direct action API 112 can identify a data provider 154 providing streaming of the requested movie, and package the one or more action data structures into messages to that data provider or to the vehicle (or mobile client device 150) to initiate a streaming session between them.

The one or more action data structures can include information for completing the request. For example, the one or more action data structures can include a XML or JSON formatted data structure that includes attributes used in completing or otherwise fulfilling the request. The attributes can include a location of the vehicle 130, a location of the mobile client device 150, an access permission level (or authorization level) of a user associated with the vehicle 130 or the mobile client device 150, a vehicle identifier, an interface identifier, a vehicular state, or a request state. The request state may include one or more attributes that are to be satisfied before the action is fulfilled. For example, for the request "Ok, change the song," the request state may have the attribute {requester: [authorized, passenger]} indicating that the requestor is an authorized user. The digital assistant application 128 or the validation engine 116 may decide to block transmission of the action data structure (or block execution of the corresponding action) if the access permission level attribute is indicative of a non-authorized user.

The direct action API 112 can retrieve a template 126 from the repository 118 to determine which fields or attributes to include in an action data structure. The direct action API 112 can determine necessary parameters and can package the information into the action data structure. The direct action API 112 can retrieve content from the repository 118 to obtain information for the attributes of the data structure. The direct action API 112 can populate the fields with data from the input audio signal. The direction action API 112 can populate the fields with data from the data provider 152, the vehicle 130, the mobile client device 150, or a combination thereof. The direction action API 112 may prompt the user for additional information when populating the fields. The templates 126 can be standardized for different types of actions, such as playing media files through the vehicle's head unit, responding to messages, performing functions within the car, initiating a call, composing and sending a message, initiating a streaming session, or a combination thereof. The remote data processing system 102 can transmit the action data structure to the vehicle data processing system 140 of the vehicle 130, which can add fields and attributes to the action data structure.

The validation engine 116 can validate or otherwise determine if an action or function associated with an action data structure should be executed or fulfilled. For instance, the validation engine 116 can check the access permission level (or authorization level) of the user making the request, and whether the action or function is within the scope of the access permission level of the user. The validation engine 116 can check the access permission level through a state attribute within the action data structure or through data stored within the data repository 118. The validation engine 116 can enable the action or function to be executed upon successful validation.

If the requestor has the proper access permission level, the validation engine 116 may still take other factors such as local laws and regulations into consideration when determining whether or not to allow or deny execution of the action. For example, in response to receiving the input audio signal indicative of "stream 'The Lion Prince' movie," and determining that movie would be streamed to display device located in front of the driver, the validation engine 116 can deny fulfilment of the streaming action because it would be inappropriate to do so or because local laws or regulations make it illegal to provide visual content that can distract the vehicle driver. However, if the movie is to be streamed to a display device located behind the front seats (e.g., the driver cannot see content rendered on the display device), the validation engine 116 can determine that it is appropriate to stream the movie. Accordingly, the validation engine 116 can allow the streaming action to be fulfilled.

The digital assistant application 128 can handle and manage conversations with users of the vehicle(s) 130 or the mobile client device(s) 150 including performing tasks or actions requested by the users. The digital assistance application 128 can initiate, terminate, or coordinate operations associated with various components of the remote data processing system 102, such as the interface 104, the NLP component 106, the interface management component 108, the audio signal generator 110, the direct action API 112, the response selector 114, the validation engine 116, the data repository 118, or a combination thereof. For instance, the digital assistance application 128 can initiate (e.g., call) and terminate instances of the components of the remote data processing system 102 (or instances of a combination of these components). The digital assistance 128 can generate, monitor, and update a state for each user conversation. The interface 104, the NLP component 106, the interface management component 108, the audio signal generator 110, the direct action API 112, the response selector 114, the validation engine 116, the data repository 118, or a combination thereof can be part of the digital assistant application 128. The remote data processing system 102 can initiate a separate instance of the digital assistance application 128 for each conversation, each vehicle 130, or each mobile client device 150.

The network 148 can include computer networks such as the internet, local, wide, metro, or other area networks, intranets, satellite networks, other computer networks such as voice or data mobile phone communication networks, and combinations thereof. The network 148 can be used by the remote data processing system 102, mobile client devices 150, and vehicles 130 to access information resources such as web pages, web sites, domain names, uniform resource locators, or data providers 152. For example, the remote data processing system 102 can, via the network 148, access a data provider 152 that provides traffic data for specific locations, such as a location associated with a vehicle 130.

The network 148 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 148 can include a wireless link, such as an infrared channel or satellite band. The topology of the network 148 may include a bus, star, or ring network topology. The network 148 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The vehicle 130 can include one or more speakers 132, one or more display devices 134, a plurality of sensors 136, and a transducer 138. The vehicle 130 can include a vehicle data processing system 140. The vehicle data processing system 140 can include an entry detection component 142, an entry authentication component 144, an access control component 146, and the digital assistant application 128. The digital assistant application 128 of the vehicle data processing system 140 may be similar to (or an instance of) that of the remote data processing system 102. The vehicle data processing system 140 and respective components can be implemented as hardware, firmware, software, or a combination thereof. The vehicle data processing system 140 and the remote data processing system 102 can have similar components. For instance, the vehicle data processing system 140 or the digital assistant application 128 thereof can include an interface 104, a NLP component 106, an interface management component 108, an audio signal generator 110, a direct action API 112, a response selector 114, a validation engine 116, a data repository 118, a combination thereof, or a combination of instances thereof. The remote data processing system 102 may include an entry detection component 142, an entry authentication component 144, an access control component 146, or a combination of instances thereof.

The one or more speakers can render audio signals (e.g., from a radio, a multimedia device, the vehicle data processing system 140, the digital assistant application 128, or a combination thereof) by converting electrical signals into audible waves. The vehicle 130 can include one or more display devices 134, such as a head-up display, a display associated with a multimedia device (e.g., for rendering media content to passengers in the back seats), or a combination thereof. The transducer 136 can convert audio input (e.g., from a user in the vehicle or background noise) into a corresponding electric signal. The vehicle data processing system 140 can process the electric signal (or transmit it to the remote data processing system 102 for processing), for example, to perform speech recognition, speaker recognition, or a combination thereof. The transducer 136 can convert an electric signal into a corresponding audio, ultrasonic, or subsonic signal.

The vehicle 130 can include a plurality of sensors 136 that provide sensor signals for use to detect entry or exit events to the vehicle 130, monitor state parameters of the vehicle (e.g., speed, auto door locks, tires pressure level, or a combination thereof), perform user authentication (or vehicle entry authentication), or a combination thereof. A variety of sensors 136 are discussed below with regard to FIG. 2.

Figure 2:
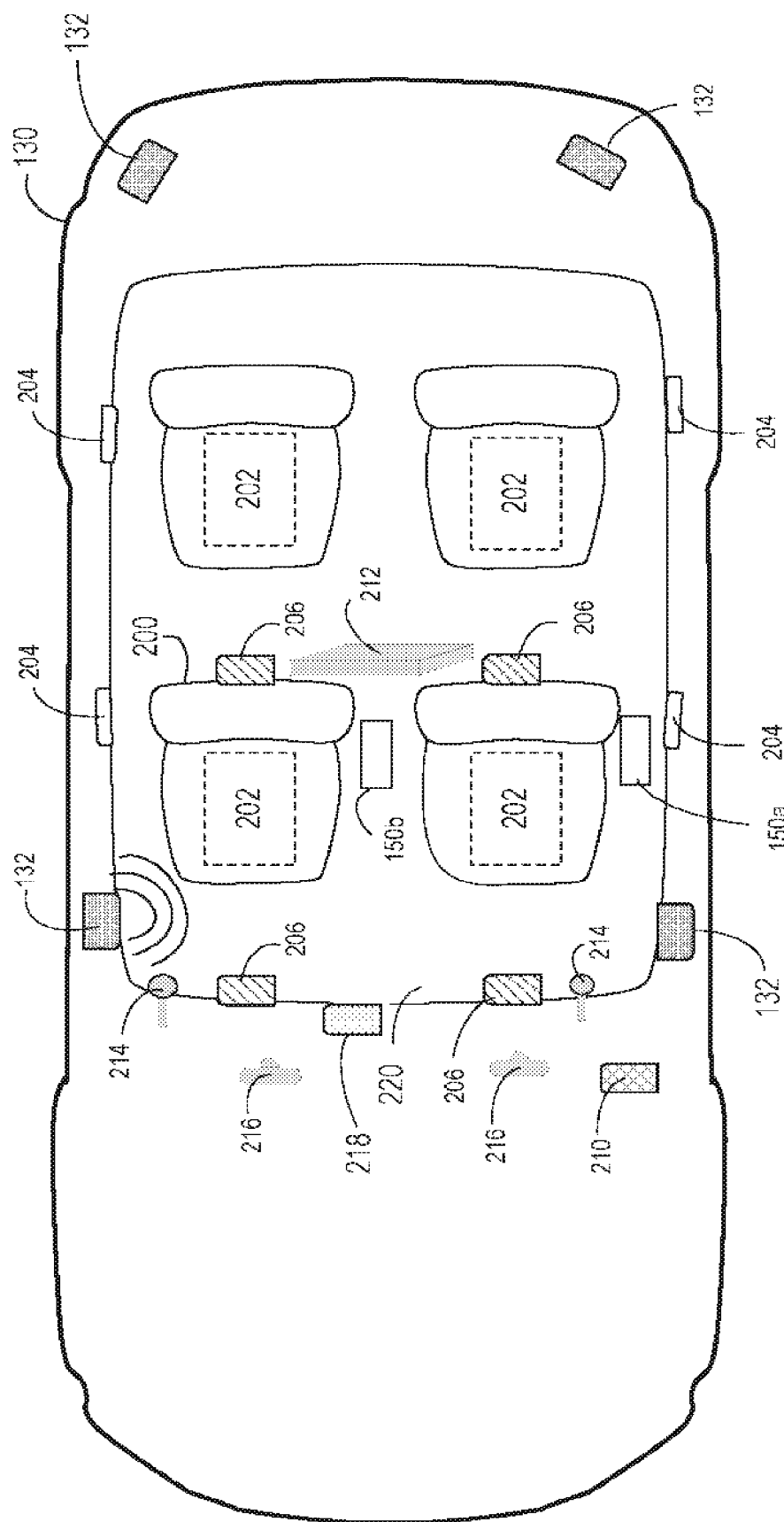
FIG. 2 illustrates a top view of the vehicle shown in FIG. 1 and depicts sensors and electronic devices associated with the vehicle.

FIG. 2 illustrates a top view of the vehicle 130 shown in FIG. 1 and depicts sensors and electronic devices associated with the vehicle 130. Referring to FIG. 2, the interior cabin of the vehicle 130 can include a plurality of seats 200. Each seat 200 can include a corresponding seat sensor 202. The seat sensor 130 can sense weight or pressure exerted on the corresponding seat 200. The seat sensor can compare sensed pressure or weight to a respective threshold value. The seat sensor 202 can provide a seat sensor signal indicative of whether the corresponding seat 200 is occupied or not based on the comparison of the sensed pressure or weight to the respective threshold value. The vehicle data processing system 140 can receive seat sensor signals from the various seat sensors 202, for example, via an interface 104 of the vehicle data processing system 140.

The vehicle 130 can include one or more door sensors 204. Each door sensor 204 can provide, to the vehicle data processing system 140, door sensor signals indicative of whether a door of the vehicle is open or closed, whether the doors of the vehicle are locked, or a combination thereof. The vehicle 130 can include a separate door sensor 204 for each door allowing the vehicle data processing system 140 to identify the state of each door (e.g., open, closed, locked, or unlocked).

The vehicle 130 can include one or more motion sensors 206 that can be arranged at one or more positions within the vehicle 130. The motion sensor 206 can sense motion in the vehicle using, for example, infrared based sensing technology, microwave based sensing technology, ultrasonic based sensing technology, vibration-based sensing technology, or a combination thereof. The one or more motion sensors 206 can provide motion sensor signals to the vehicle data processing system 140 indicative of whether or not motion is sensed within the vehicle. Sensed motion can be indicative of occupancy of the vehicle by one or more users. A separate motion sensor 206 can be arranged or installed in association with (e.g., in a close vicinity to or facing) a corresponding seat 200 of the vehicle 130. The vehicle 130 may include pressure sensors (not shown in FIG. 2) to sense substantial (e.g., greater than a predefined threshold value) variations in air pressure within the vehicle 130. The vehicle ignition system or a sensor thereof may provide signals to the vehicle data processing system 140 indicative of the ignition system being turned on or off, responsive to turning on or off the ignition system by a user.

The vehicle 130 can include a key fob receiver device 210 for receiving signals from a remote key fob transmitter device (not shown in FIG. 2). The key fob receiver device 210 and the key fob transmitter device form a remote keyless system (RKS). The remote key fob transmitter device can transmit a signal including an entry code to lock or unlock the vehicle. The entry code can encrypted. The key fob receiver device 210 can actuate the locking or unlocking of the car if the entry code in the signal matches a code stored in the key fob receiver device 210. The key fob receiver device 210 can be communicatively coupled to the vehicle data processing system 140. The key fob receiver device 210 can provide the vehicle data processing system 140 with indications (or signals indicative of) events of successful or unsuccessful unlocking or unlocking via the RKS.

The vehicle 130 can include one or more microphones 214 to capture input audio signals and a plurality of speakers (or loudspeakers) 132 to provide audio output. The one or more microphones 214 can be arranged at one or more positions within the vehicle 130. The vehicle data processing system 140 or the corresponding digital assistant application 128 may turn on or off the microphone(s) 214 based on the occupancy state of the vehicle 130. For instance, the vehicle data processing system 140 or the corresponding digital assistant application 128 can cause a microphone 214 to be turned on responsive to detection of occupancy of the vehicle 130 (or detection of an entry event). The microphone(s) 214 or the speakers can be automatically turned on responsive to starting the vehicle. The vehicle data processing system 140 or the corresponding digital assistant application 128 can receive input audio signals obtained by the one or more microphones 214, and apply speech recognition or speaker recognition to the input audio signals (or corresponding electric signals).

The vehicle 130 can include one or more cameras 216 to capture digital pictures. Each camera 116 can be oriented towards a corresponding seat 200 of the vehicle 130 such that a face of an individual occupying that seat 200 would be within the visual range of the camera 116. The vehicle data processing system 140 or the corresponding digital assistant application 128 can trigger the camera 216 to capture one or more digital images, for example, responsive to detection of an entry event. The vehicle data processing system 140 or the corresponding digital assistant application 128 can use the captured image(s) to perform face recognition. The vehicle data processing system 140 or the corresponding digital assistant application 128 may trigger the camera 216 to capture one or more additional images if previously captured images were found to be inadequate for face recognition (e.g., no clear or complete view of a user's face). The vehicle data processing system 140 or the corresponding digital assistant application 128 can cause the orientation of a camera 216 to be adjusted (e.g., rotated). The vehicle data processing system 140 or the corresponding digital assistant application 128 can provide an audio output signal via the speakers 132 indicative of a request to the user to face the camera 216 or adjust the camera's orientation.

The vehicle 130 can include a communication transceiver 218, such as a short wavelength (e.g., 2.4-2.5 GHz) data communication transceiver, a near-field communication (NFC) transceiver, or a combination thereof, to communicate with mobile client devices 150 within the vehicle, such as mobile client devices 150a and 150b. The vehicle data processing system 140 or the corresponding digital assistant application 128 can be communicatively coupled to the communication transceiver 218. The communication transceiver 218 can communicate with the mobile client devices 150a and 150b (or generally mobile client devices 150 in the vehicle 130) to obtain the device identifiers (IDs) of these devices. The communication transceiver 218 can provide the obtained client IDs to the vehicle data processing system 140 or the corresponding digital assistant application 128. The vehicle data processing system 140 or the corresponding digital assistant application 128 can instruct the user(s) (e.g., via an audio output signal transmitted the speakers 132), for example, to turn on a transceiver on a respective mobile client device (e.g., mobile client device 150a or 150b), or bring the client device close to the communication transceiver 218 (for NFC communication), if no client IDs are obtained by the communication transceiver 218 after a predetermined time period since detection of an entry event or detection of vehicle occupancy. The vehicle data processing system 140 or the corresponding digital assistant application 128 can transmit an ultrasonic output signal or a subsonic output signal via the speakers 132 to trigger the mobile client device(s) 150a or 150b to transmit respective ID(s). The client device(s) (e.g., mobile client device 150a or 150b) can interpret the ultrasonic signal or the subsonic signal as a request for the respective ID(s), and transmit the respective client ID(s) responsive to the ultrasonic output signal or the subsonic signal.

The vehicle can include a back-seat entertainment system 212 including, for example, a multimedia device for playing multimedia content (e.g., audio visual content, streaming content, gaming content, or a combination thereof). The back-seat entertainment system 212 may be located behind the front seats 200 to avoid visual distraction to the driver. The vehicle 130 can also include a head unit 220, which can execute computer code instructions related to one or more of the components described in relation to the vehicle data processing system 140, the corresponding digital assistant application, or the vehicle 130. The head unit 220 can include one or more processors for executing the computer code instructions, and one or more storage devices (not shown in FIG. 2) for storing the computer code instructions and data such as data associated with the data repository 118, playlists, settings data, or a combination thereof. The head unit 220 can include a display (not shown in FIG. 2) for rendering visual data to users, such as navigation maps, playlist information, radio channel information, or a combination thereof. The head unit 220 can be communicatively coupled to (e.g., via wired or wireless connections) the sensors 136 (such as the seat sensors 202, the door sensors 204, the motion sensors 206, the air pressure sensor(s), the ignition system (or a corresponding sensor), the key fob receiver device 210, the microphone(s) 214, the camera(s) 216, or the communication transceiver 218), the speakers 132, or the multimedia device of the back entertainment system 212.

Referring back to FIG. 1, the entry detection component 142, the entry authentication component 144, the access control component 146, or a combination thereof can be part of the digital assistant application 128 of the vehicle data processing system 140. The entry detection component 142 can receive at least one sensor signal obtained by one or more sensors 136 installed in the vehicle 130. For instance, the entry detection component 142 can receive a key fob signal from the key fob receiver device 210, door sensor signal from the door sensors 204, seat sensor signal from the seat sensors 202, motion sensor signal from the motion sensors 206, pressure signal from air pressure sensors, ignition signal from the vehicle ignition system (e.g., indicative of the ignition system being turned on) or a combination thereof. At least one of the sensors 136 can be capable of transmitting corresponding sensor signals even when the vehicle ignition is off.

The entry detection component 142 can determine (or detect) an entry event into the vehicle 130, based on the at least one sensor signal. The entry event can be indicative of a user entering the vehicle 130. The entry detection component 142 may determine an entry event based on a sensor signal from a single type of sensor 136. For instance, a sensor signal from one of the key fob receiver device 210, the door sensors 204, the seat sensors 202, the motion sensors 206, or the air pressure sensor(s) can be sufficient for the entry detection component 142 to make a determination regarding occurrence of an entry event. The entry detection component 142 may determine an entry event based on sensor signals from two or more types of sensors 136. For example, the entry detection component 142 can be configured to determine occurrence of an entry event only if two or more sensors of different types (e.g., both the key fob receiver device 210 and the door sensor 204, or the door sensor 204 and the motion sensor 206) provide corresponding sensor signals indicative of vehicle occupancy by one or more individuals.

The digital assistant application 128 of the vehicle data processing system 140 can operate in a light mode prior to detection of any entry event. In light mode, the entry detection component 142 may be awake while other components of the digital assistant application 128 of the vehicle data processing system 140 may be in sleep mode to save on vehicle battery power. The entry detection component 142 can awake other components of the digital assistant application 128 of the vehicle data processing system 140, responsive to detection of the entry event into the vehicle 130.

The entry authentication component 144 can receive, responsive to the entry event into the vehicle 130, at least two authentication input signals. The at least two authentication input signals can be obtained by at least one sensor (or electronic device) 136 associated with the vehicle 130. For instance, the entry authentication component 144 can receive a first authentication input signal and a second authentication input signal that are obtained by the at least one sensor 136 associated with the vehicle 130. The at least two authentication input signals may be of distinct types and obtained by at least two different types of sensors. For example, the entry authentication component 144 can receive at least two of (1) a key fob authentication signal from the key fob receiver device 210, (2) a mobile device identifier (ID) authentication signal from a corresponding mobile client device (e.g., a smart phone, a tablet, or smart watch) 150, (3) an audio input signal from a microphone 214, (4) or a digital image from a camera 216.

The key fob authentication signal can be indicative of whether or not the key fob receiver device 210 received a coded radio signal that corresponds to the vehicle 130 (e.g., that led to successful unlocking of the vehicle doors). The mobile device identifier (ID) authentication signal can be a signal provided by a mobile client device 150 and including a corresponding identifier ID of the mobile client device 150. As discussed above with regard to FIG. 2, the digital assistant application 128 of the vehicle data processing system 140 can cause, e.g., by transmitting ultrasonic or subsonic signals via the speakers 132 or providing output audio signals, the mobile client device(s) 150 to transmit the corresponding mobile device identifier (ID) authentication signal. The digital assistant application 128 can receive the audio input signal directly from the microphone(s) 214 or from a storage device coupled to the microphone(s) 214 and configured to maintain audio signals captured by the microphone(s) 214 during a recent predefined time period (e.g., during the last 30 seconds, the last minute, the last 2 minutes). The storage device can timestamp recorded audio signals. The storage device can store audio signals from separate microphones separately. To digital assistant application 128 may provide an audio output signal via the speakers 132 to trigger any potential users in the vehicle 130 to speak (e.g., by asking a specific question or simply asking the user(s) to speak), responsive to detection of the entry event into the vehicle. The digital assistant application 128 of the vehicle data processing system 140 can trigger one or more cameras 216 to capture digital image(s), responsive to the detection of the entry event into the vehicle 130.

The digital assistant application 128 of the vehicle data processing system 140 can generate (or update) an occupancy state of the vehicle 130 responsive to the entry event into the vehicle 130. The occupancy state of the vehicle 130 can map each authenticated user to a corresponding seat 200 of the vehicle 130 (e.g., based on sensor signals from a corresponding seat sensor or a motion sensor associated with that seat 200). The digital assistant application 128 of the vehicle data processing system 140 may trigger only the microphone(s) 214 or the camera(s) 216 associated with occupied seats 200.

The entry authentication component 244 can determine at least two authentication states based on the at least two received authentication input signals and a plurality of authentication credentials. For instance, the entry authentication component 244 can determine a first authentication state based on the first authentication input signal and a first authentication credential from the plurality of authentication credentials, and determine a second authentication state based on the second authentication input signal and a second authentication credential of the plurality of authentication credentials. For each of the received authentication input signals, the entry authentication component 244 can perform a separate authentication and determine a corresponding authentication state. Each authentication state can be indicative of whether the corresponding authentication is successful or not. An authentication can be successful if the entry authentication component 244 can identify a specific user or a user category based on that authentication. The authentication state can be indicative of the identified user or user category in case of successful authentication. The authentication state may be indicative of a probability value for each identified user or user category in the case of successful authentication. In case of failed authentication, the corresponding authentication state can be indicative of a failure reason (e.g., inadequate authentication input signal or a lack of a match based on corresponding authentication credentials).

For a key fob authentication, the entry authentication component 244 can access a list of individuals having access to the vehicle' keyless remote transmitter device (e.g., the vehicle's owner, the owner's family member, the owner's close friends, or a combination thereof), responsive to receiving a key fob signal indicative of successful remote unlocking of the vehicle doors. The list of individuals can represent the authentication credentials associated with key fob authentication, and can be stored in a memory of the vehicle (e.g., within the data repository 118). The entry authentication component 244 can determine each of the individuals in the list as a potential user currently occupying the vehicle. The entry authentication component 244 can assign probability value to each of the individuals, for example, based on statistical data of entries to the vehicle 130. For example, the owner may be assigned the highest probability, the second highest probability may be assigned to the owner's spouse and lower probability values may be assigned to others.

For a mobile device identifier (ID) authentication signal, the corresponding credentials can include a set of device IDs and corresponding device users' identities stored in a memory of the vehicle 130 (e.g., within the data repository 118). These signals can be encrypted. The entry authentication component 244 can compare the mobile client device ID in the received mobile device ID authentication signal to the set of stored device IDs. If a match is found, the entry authentication component 244 can identify the user associated with the matching device ID as the user occupying the vehicle 130. The authentication state may include a probability value associated with the user corresponding to the matching feature(s). If no match is found, the entry authentication component 244 can determine the authentication state corresponding to the mobile device identifier (ID) authentication signal as a failed authentication. The authentication can include the failure reason as lack of matching credential.

In the case of speaker recognition authentication, the digital assistant application 128 (or a corresponding speech processor component) can extract one or more speaker indicative features from the received audio input signal, and the entry authentication component 244 can compare the extracted features to a set of corresponding speaker specific features (authentication credentials) stored, for example, within the data repository 118. If a match is found, then the entry authentication component 244 can determine the authentication state (for speaker recognition authentication) as successful. The authentication state can include an indication of the user associated with the matching feature(s) in the set of corresponding speaker specific features. The authentication state may include a probability value associated with the user corresponding to the matching feature(s). If no match is found, the entry authentication component 244 can determine the authentication state as a failed authentication, which may include the failure reason as lack of matching credential.

In the case of face recognition based authentication, the digital assistant application 128 (or a corresponding image processor component) can extract one or more facial features from the received digital image, and the entry authentication component 244 can compare the extracted features to a set of corresponding features (associated with one or more know users) stored, for example, within the data repository 118. If a match is found, then the entry authentication component 244 can determine the authentication state (for face recognition based authentication) as successful. The authentication state can include an indication of the user associated with the matching facial feature(s) in the set of corresponding facial features. The authentication state may include a probability value associated with the user corresponding to the matching facial feature(s). If no match is found, the entry authentication component 244 can determine the authentication state as a failed authentication, which may include the failure reason as lack of matching credential. If the digital assistant application 128 (or the corresponding image processor component) fails to extract the facial features (e.g., for lack of clear view of the face in the image) the failure reason can be defined as inadequate input.

The access control component 246 can identify an access permission level of a plurality of access permission levels based at least in part on the determined authentication states, such as the first authentication state and the second authentication state. The access control component 246 can determine a specific user or a user category of a plurality of user categories based on the authentication states determined by the entry authentication component 244. For instance, the access control component 246 can compare the information in various authentication states (e.g., indications of users or user categories and corresponding probability values if applicable) to determine a final user identity or a user category associated with the individual occupying the vehicle 130. The access control component 246 may use a decision graph or a plurality of decision rules in determining the final user identity or the user category associated with the individual occupying the vehicle 130. The plurality of user categories may include "owner," "family member: adult," "family member: kid," "friend," "new user" or a combination thereof. The access control component 246 can access a data structure (e.g., from the data repository 118) mapping each of a plurality of users or user categories to a corresponding access permission level. The access control component 246 can determine an access permission level associated with the determined final user identity or user category based on the accessed data structure.

The access control component 246 can identify, responsive to the access permission level, a subset of a set of functionalities available via the vehicle 130. The digital assistant application 128 can arrange data associated with separate users or user categories into a plurality of separate data accounts or a plurality of separate memory partitions. For a given user, the corresponding data account or memory partition can include data associated with a user, multimedia files associated with the user, access settings (e.g., permission levels or accessible functionalities) for the user, or a combination thereof. The set of functionalities available via the vehicle 130 can include functionalities or tasks that can be performed by digital assistant application 128 such as accessing data stored in a memory of the vehicle 130 (e.g., data associated with a data account or a memory partition), accessing locally stored playlists, controlling rendering of locally stored media files (or radio channels), actuating a vehicle window or a vehicle door, locking or unlocking vehicle doors, adjusting vehicle air conditioning (AC) settings, remotely opening or closing a home garage door, controlling or adjusting home related settings (e.g., home AC, home security system, sprinkler, or a combination thereof), accessing online services or mobile applications (e.g., online streaming or download, online shopping, or email), or a combination thereof. The digital assistant application 128 can encrypt each data account or memory partition separately using, for example, a security key specifying to the corresponding user or user category. The security keys can be defined (or generated), for example, by hashing information (e.g., mobile device or other identifiers) associated with a corresponding user. The digital assistant application 128 may group or combine playlists (or other non-security-sensitive or non-privacy-sensitive data) associated with various users into a common memory area. For instance, the grouped playlists may be accessible to the various users entering the vehicle 130.

Each access permission level can be associated with a respective subset of the set of functionalities available. The association (or mapping) between the access permission levels and the corresponding subsets of functionalities can be set or adjustable by an administrator of the digital assistant application 128 (e.g., owner of the vehicle 130). The association (or mapping) between the access permission levels and the corresponding subsets of functionalities can be maintained in a second data structure (e.g., table) stored in the data repository 118. The access control component 246 can determine the subset of functionalities associated with the determined permission level based on the second data structure.

The access control component 246 can directly identify the subset of the set of functionalities available via the vehicle 130 based at least in part on the determined authentication states (e.g., first and second authentication states) without determining an access permission level. For instance, after identifying a user category based on the determined authentication states, the access control component 246 can access a data structure mapping each user category to a corresponding subset of functionalities to identify the subset of functionalities. Determining the plurality of authentication states, the access permission level, the subset of functionalities, or a combination thereof represents a multi-factor authentication process.

The digital assistant application 128 (of the vehicle data structure 140) can provide vehicular access to the determined subset of functionalities. When the digital assistant application 128 receives an audible request from a user in the vehicle 130, the digital assistant application 128 can a identify a corresponding requested action or functionality. For instance, the direct action API component 112 can generate an action data structure indicative of the requested action or functionality. The validation engine 116 can compare, for each action data structure, the corresponding action or functionality to the subset of functionalities mapped to the access permission level of the requestor to determine whether allow the action (or functionality) or deny it. When denying or blocking an action or functionality, the digital assistant application 128 (or the validation engine 116) can delete the corresponding action data structure and provide an audio output via the speakers 132 to indicate that requestor is denied access to the requested functionality. The denying or blocking of an action data structure before taking any active steps in performing the corresponding functionality or action leads to efficient use of resources (e.g., computational and bandwidth resources) as unnecessary communications and unnecessary computations are avoided. If the action corresponding to the action data structure matches a functionality in the subset of functionalities accessible by the requestor, the validation engine can forward the action data structure to another component for execution. The digital assistant application 128 may provide an audio output signal (e.g., via the speakers 132) indicating that access to the requested functionality is granted. The digital assistant application 128 may provide an audio output signal (e.g., via the speakers 132) when the functionality is executed to indicate that the request was fulfilled.

When determining the access permission level or the subset of allowed functionalities for a given user, the access control component 246 can determine, for each user occupying the vehicle, a corresponding seat 200 of the vehicle 130 where that user is located. The access control component 246 may use seat sensor signals, door sensor signals, motion sensor signals, audio input signals from microphones 214, digital images from cameras 216, or a combination thereof to map each user in the vehicle to a corresponding seat 200. Such mapping can represent an occupancy state of the vehicle 130 which can facilitate distinguishing between audible requests received later from separate users in the vehicle. For instance, when the digital assistant application 128 receives an audible request to open a vehicle window or unlock a vehicle door, the digital assistant application 128 can determine whether the audible request is from an adult in a front seat or a person in the back seat based on, for example, recorded instances of the audible request associated with separate microphones 214 in the vehicle. The digital assistant application 128 can compare the amplitudes of the recorded instances of the audible request or the time delays between these instances to identify the microphone 214 closest to (and therefore the seat associated with) the user making the audible request. The instance of the audible request (e.g., corresponding electric signal) recorded by the microphone 214 that is closest to the user making the audible request can have an earlier arrival time and higher amplitudes than other instances associated with other microphones 214 that are father away from the user making the request. By identifying the closest microphone 214 closest to the requestor, the digital assistant application 128 can user the mapping between the seats 200 and the users to identify the requestor.

The digital assistant application 128 (or the entry detection component 142) may detect, using received sensor signals (e.g., a key fob signal, at least two separate seat sensor signals, at least two door sensor signals, at least two motion sensor signals, an ignition system signal, an air pressure sensor signal, or a combination thereof), two entry events indicative of a first user and a second user entering the vehicle. The two entry events can be associated with simultaneous occupancy of the vehicle by the first and second users. The entry authentication component 144 can receive, responsive to the two entry events, a first plurality of authentication input signals (e.g., associated with the first user) and a second plurality of authentication input signals (e.g., associated with the second user). For example, the first and second pluralities of authentication input signals can include at least two input audio signals (e.g., from separate microphones 214), at least two digital images (e.g., from separate cameras 216), at least two mobile device ID authentication signals (e.g., from separate mobile client devices 150), a key fob signal, or a combination thereof.

The entry authentication component 144 can determine a first plurality of authentication states based on the first plurality of authentication input signals and a first set of authentication credentials of a plurality of authentication credentials. The entry authentication component 144 can check each authentication input signal of the first plurality of authentication input signals (associated with the first user) against corresponding authentication credentials of the plurality of authentication credentials (e.g., as described above for the various types of authentication input signals) to determine the first plurality of authentication states. The entry authentication component 144 can check each authentication input signal of the second plurality of authentication input signals (associated with the second user) against corresponding authentication credentials of the plurality of authentication credentials to determine the second plurality of authentication states.

The access control component 246 can identify a first access permission level (e.g., for the first user) based at least in part on the first plurality of authentication states, and identify a first subset of the set of functionalities available via the vehicle 130, responsive to the first access permission level. The access control component 246 can identify the first user or a corresponding user category based on the first plurality of authentication states, and identify the first access permission level based on the data structure mapping access permission levels to corresponding subsets of functionalities. In a similar way, the access control component 246 can identify a second access permission level (e.g., for the second user) based at least in part on the second plurality of authentication states, and identify a second subset of the set of functionalities available via the vehicle 130, responsive to the second access permission level. The access control component 246 can directly identify the first and second subsets of the set of functionalities based at least in part on the determined authentication states without determining a first and second access permission levels. For instance, after identifying a first and second user categories based on the determined authentication states, the access control component 246 can access a data structure mapping each user category to a corresponding subset of functionalities to identify the first and second subsets.

The digital assistant application 128 can provide the first user vehicular access to the first subset of functionalities, and provide the second user vehicular access to the second subset of functionalities. Providing the first user access to the first subset of functionalities can include the validation engine 116 intercepting action data structures associated with requests made by the first user and checking whether or not corresponding actions (or a requested functionality) match any of the functionalities in the first subset. If no match is found, the validation engine 116 can delete the action data structure and block the corresponding actions or the requested functionality, and the digital assistant application 128 can provide an audio output to inform the first user of the denial of access. Otherwise, the digital assistant application 128 can perform the functionality, and may provide an audio output indicative of granting the access or completion of the requested functionality. Similarly, providing the second user access to the second subset of functionalities can include the validation engine 116 intercepting an action data structure associated with a requested functionality by the second user and comparing the corresponding action of the action data structure (or the requested functionality) to the functionalities in the second subset. Based on the comparison, the digital assistant application 128 can decide whether to perform or block a requested functionality of the second user.

The digital assistant application 128 may monitor the data accounts or memory partitions (e.g., stored in the data repository 118 or a memory of the vehicle 130). The data accounts or memory partitions may be temporal as the digital assistant application 128 may maintain each of the data accounts or memory partitions for a time period dependent not exceeding a predefined time duration since a last entry event (or last exit event) of a corresponding user. The digital assistant application 128 can maintain a separate time counter for each data account or memory partition. The digital assistant application 128 can reset the time counter for a given data account, responsive to a detected entry event (or a detected exit event) by the user associated with the data account. If the time counter exceeds the predefined time duration (e.g., a week, few weeks, a month, or few weeks), the digital assistant application 128 can delete the corresponding data account or memory partition (or data therein). Since the data accounts (or the memory partitions) are stored locally, using temporal data accounts allows of efficient use of vehicle memory resources.

The digital assistant application 128 (or the entry detection component 142) can detect an exit event indicative of the user exiting the vehicle 130 based. For instance, the entry detection component 142 can receive one or more additional sensor signals (e.g., an ignition system signal, a seat sensor signal, a motion detection signal, an air pressure signal, a door sensor signal, a key fob signal, or a combination thereof). The one or more additional sensor signals can be indicative of the ignition system being turned off, vacancy of a previously occupied seat 200, decrease in detected motion within the vehicle 130, substantial variation in air pressure within the vehicle 130 (e.g., as the door opens and closes), a door opening and closing, a remote locking of the doors, or a combination thereof. The entry detection component 142 can determine a user exiting the vehicle 130 based on the one or more additional sensor signals.

The digital assistant application 128 can update the occupancy state of the vehicle 130, responsive to the exit event. For instance, upon determining that a specific user left the vehicle 130 (e.g., based on the additional sensor signals), the digital assistant 128 can update the occupancy state of the vehicle by deleting the user from the list of users mapped to seats 200 in the vehicle 130, setting the corresponding seat 200 as vacant, or a combination thereof. Responsive to the update of the occupancy update, the digital assistant application 128 can reset the time counter associated with the data account of the user who left. The digital account assistant may encrypt the temporal data account (or memory partition) associated with the user who left. The digital assistant application 128 can set the temporal data account associated with user who left the vehicle 130 as un-accessible until the same user is authenticated again in the vehicle 130 (after a new entry event by that user The mobile client device(s) 150 can include a corresponding data processing system including a corresponding instance of the digital assistant application 128 (both not shown in FIG. 1). The data processing system and the digital assistant application 128 associated with the mobile client device 150 may include similar components as those discussed with regard to the remote data processing system 102 and the vehicle data processing system 140.

Processes (e.g., related to multi-factor authentication and access control to functionalities available via the vehicle 130) described above with regard to the vehicle data processing system 140 can be performed by the remote data processing system 102 or the data processing system of the client device 150. For instance, the vehicle data processing system 140 (or the corresponding digital assistant application 128) may receive sensor signals, authentication input signals, or a combination thereof, and transmit the received signals to the remote data processing system 102 (e.g., via the client device 150) or to the data processing system associated with the client device 150. Entry event detection, multi-factor authentication, or determination of access permission levels or accessible functionalities can be performed by the remote data processing system 102 or the data processing system associated with the client device 150.

Figure 3:
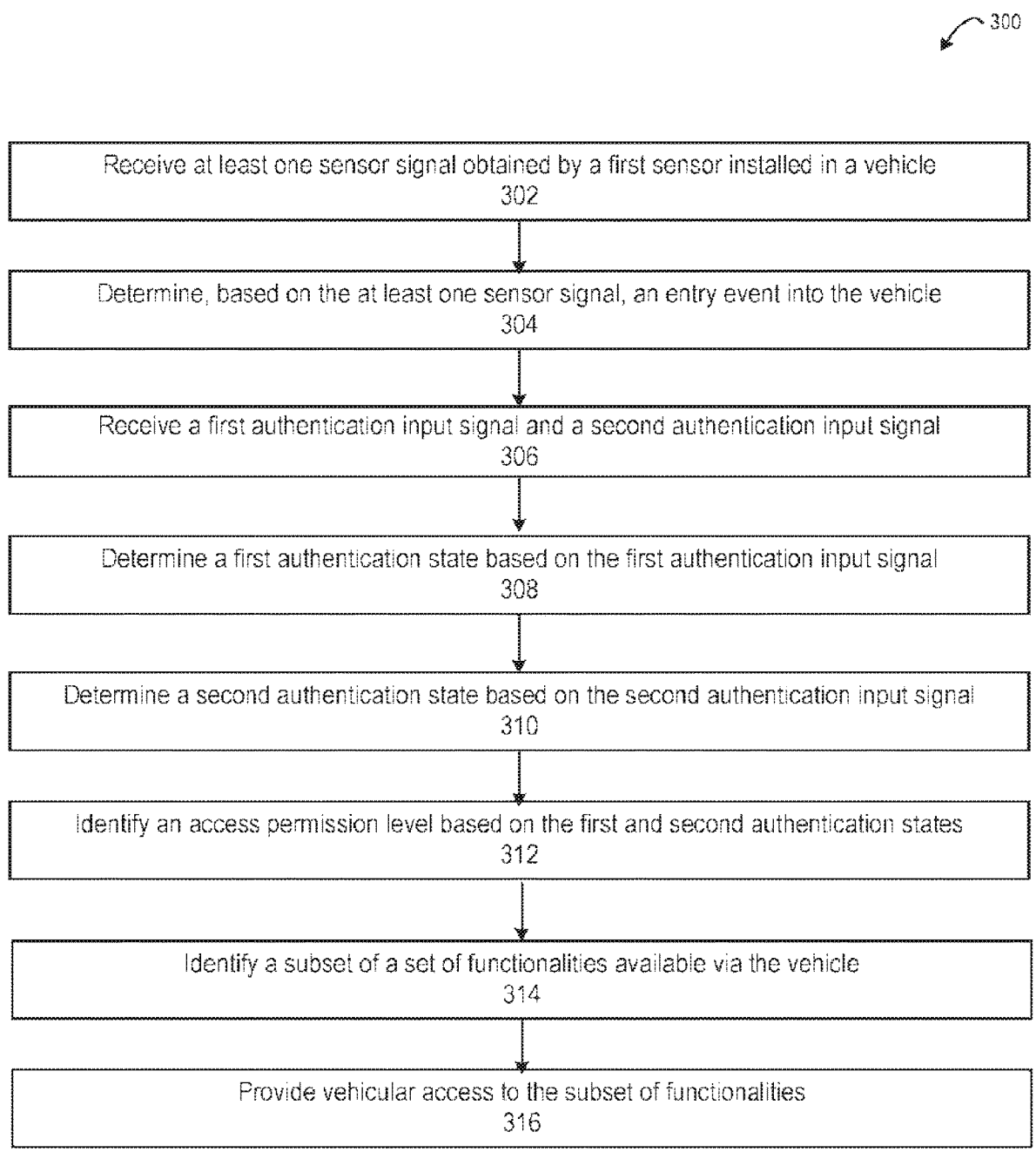
FIG. 3 illustrates an example method of multi-factor entry authentication of vehicle entry events using the example system illustrated in FIG. 1.

FIG. 3 illustrates an example method 300 of multi-factor entry authentication of vehicle entry events. The method 300 can include receiving at least one sensor signal obtained by a first sensor installed in a vehicle (BLOCK 302). The method 300 can include determining, based on the at least one sensor signal, an entry event into the vehicle (BLOCK 304). The method 300 can include receiving, responsive to the entry event into the vehicle, a first authentication input signal and a second authentication input signal (BLOCK 306). The method 300 can include determining a first authentication state based on the first authentication input signal and a first authentication credential from a plurality of authentication credentials (BLOCK 308). The method 300 can include determining a second authentication state based on the second authentication input signal and a second authentication credential of the plurality of authentication credentials (BLOCK 310). The method 300 can include identifying an access permission level of a plurality of access permission levels based at least in part on the first authentication state and the second authentication state (BLOCK 312). The method 300 can include identifying, responsive to the access permission level, a subset of a set of functionalities available via the vehicle (BLOCK 314). The method 300 can include the data processing system providing vehicular access to the subset of functionalities (BLOCK 316). In general, the method 300 can include any of the steps discussed with regard to the components in FIGS. 1 and 2.

Referring to FIGS. 1-3, the method 300 can include a data processing system, including a digital assistant, receiving at least one sensor signal obtained by a first sensor installed in the vehicle (BLOCK 302). The data processing system can include the remote data processing system 102, the vehicle data processing system 140 or a data processing system associated with the mobile client device 150. The data processing system can receive, for example, a key fob signal from the key fob receiver device 210, door sensor signal from the door sensors 204, seat sensor signal from the seat sensors 202, motion sensor signal from the motion sensors 206, pressure signal from air pressure sensors, ignition signal from the vehicle ignition system (e.g., indicative of the ignition system being turned on) or a combination thereof.

The method 300 can include the data processing system determining, based on the at least one sensor signal, an entry event into the vehicle 130 (BLOCK 304). The entry event can be indicative of a user entering the vehicle 130. The data processing system may determine an entry event based on a sensor signal from a single type of sensor 136, or may determine an entry event based on sensor signals from two or more types of sensors 136 (e.g., ignition signal and seat senor signal). The data processing system may use one or more decision rules or a decision graph to determine the entry event. The decision rules or the decision graph can be indicative of combinations of sensors signals implying occurrence of an entry event.

The method 300 can include the data processing system receiving, responsive to the entry event into the vehicle, a first authentication input signal and a second authentication input signal (BLOCK 306). The first authentication input signal and the second authentication input signal can be obtained by at least another sensor (e.g., key fob receiver device 210, microphone 314, camera 216, or communication transceiver 218) associated with the vehicle 130. The data processing system may receive two or more authentication input signals. The two or more authentication input signals may be of distinct types and obtained by at least two different types of sensors. For example, the entry authentication component 144 can receive at least two of (1) a key fob authentication signal from the key fob receiver device 210, (2) a mobile device identifier (ID) authentication signal from a corresponding mobile client device (e.g., a smart phone, a tablet, or smart watch) 150, (3) an audio input signal from a microphone 214, (4) or a digital image from a camera 216. The data processing system can trigger two or more processors (or electronic devices) associated with the vehicle 130 to provide corresponding authentication input signals, responsive to the entry event (as discussed above with regard to FIGS. 1 and 2).

The method 300 can include the data processing system determining a first authentication state based on the first authentication input signal and a first authentication credential from a plurality of authentication credentials (BLOCK 308), and determining a second authentication state based on the second authentication input signal and a second authentication credential of the plurality of authentication credentials (BLOCK 310). The determining of both the first authentication state and the second authentication state can be viewed as a multi-factor authentication process. The data processing system may determine more than two authentication states depending on the number of authentication input signals received. For each of the received authentication input signals, the data processing system can perform a separate authentication and determine a corresponding authentication state. Each authentication state can be indicative of whether the corresponding authentication is successful or not. An authentication can be successful if the data processing system can identify a specific user or a user category based on that authentication. The authentication state can be indicative of the identified user or user category in case of successful authentication. The authentication state may be indicative of a probability value for each identified user or user category in the case of successful authentication. In case of failed authentication, the corresponding authentication state can be indicative of a failure reason (e.g., inadequate authentication input signal or a lack of a matching authentication credential). The process of determining an authentication state for various types of authentication input signals is described above with regard to FIGS. 1 and 2.

The method 300 can include the data processing system identifying an access permission level of a plurality of access permission levels based at least in part on the first authentication state and the second authentication state (BLOCK 312). The method 300 can include the data processing system identifying, responsive to the access permission level, a subset of a set of functionalities available via the vehicle (BLOCK 314). The data processing system can identify a specific user or a respective user category of a plurality of user categories based on the determined authentication states. For instance, the data processing system can compare the information in various authentication states (e.g., indications of users or user categories and corresponding probability values if applicable) to identify a final user identity or a user category associated with the individual occupying the vehicle 130. The plurality of user categories may include, for example, "owner," "family member: adult," "family member: kid," "friend," "new user" or a combination thereof. The data processing system can determine an access permission level associated with the determined final user identity or user category based on a data structure mapping each user or user category to a corresponding access permission level. The data processing system can identify the subset of functionalities based on another data structure mapping each access permission level to a corresponding subset of functionalities.

The set of functionalities available via the vehicle 130 can include functionalities or tasks that can be performed by the digital assistant application 128 of the data processing system, such as accessing data stored in a memory of the vehicle 130 (e.g., data associated with a data account or a memory partition), accessing locally stored playlists, controlling rendering of locally stored media files (or radio channels), actuating a vehicle window or a vehicle door, locking or unlocking vehicle doors, adjusting vehicle air conditioning (AC) settings, remotely opening or closing a home garage door, controlling or adjusting home related settings (e.g., home AC, home security system, sprinkler, or a combination thereof), accessing online services or mobile applications (e.g., online streaming or download, online shopping, or email), or a combination thereof. The acts in BLOCK 312 and 314 can combined into a single step of determining the subset of functionalities based on the first and second authentication states (e.g., without determining an access permission level).

The method 300 can include the data processing system providing vehicular access to the subset of functionalities (BLOCK 316). The data processing system can receive an audible request from a user in the vehicle 130, and identify a corresponding requested action or functionality. The data processing system generate an action data structure indicative of the requested functionality, and compare the requested functionality to the subset of functionalities mapped to the access permission level of the requestor to determine whether to allow the requested functionality or deny it. the speakers 132) when the functionality is executed to indicate that the request was fulfilled. The data processing system can either cause execution of the requested functionality or block it (as discussed above with regard to FIGS. 1 and 2) based on the comparison.

As described above with regard to FIGS. 1 and 2, the data processing system can arrange data associated with separate users or user categories into a plurality of separate temporal data accounts (or temporal memory partitions) and delete any data account (or memory partition) with no corresponding entry event for a predefined time duration. The data processing system can encrypt each data account or memory partition separately using, for example, a security key specifying to the corresponding user or user category. The security keys can be defined (or generated), for example, by hashing information (e.g., mobile device or other identifier) associated with a corresponding user. The data processing system can detect an exit event based on additional sensor signals, and update an occupancy state of the vehicle based on the exit event.

The data processing system can two (or more) entry events indicative of a two (or more) users entering the vehicle. The detected entry events can lead to simultaneous occupancy of the vehicle 130 by the users. The data processing system can receive authentication input signals for each of the users, and perform a separate multi-factor authentication (with multiple authentication states identified) for each user as discussed above with regard to FIGS. 1 and 2. The data processing system can determine a separate access permission level and a separate subset of accessible functionalities for each user. The data processing system can then grant each user access to the corresponding subset of functionalities.

Figure 4:
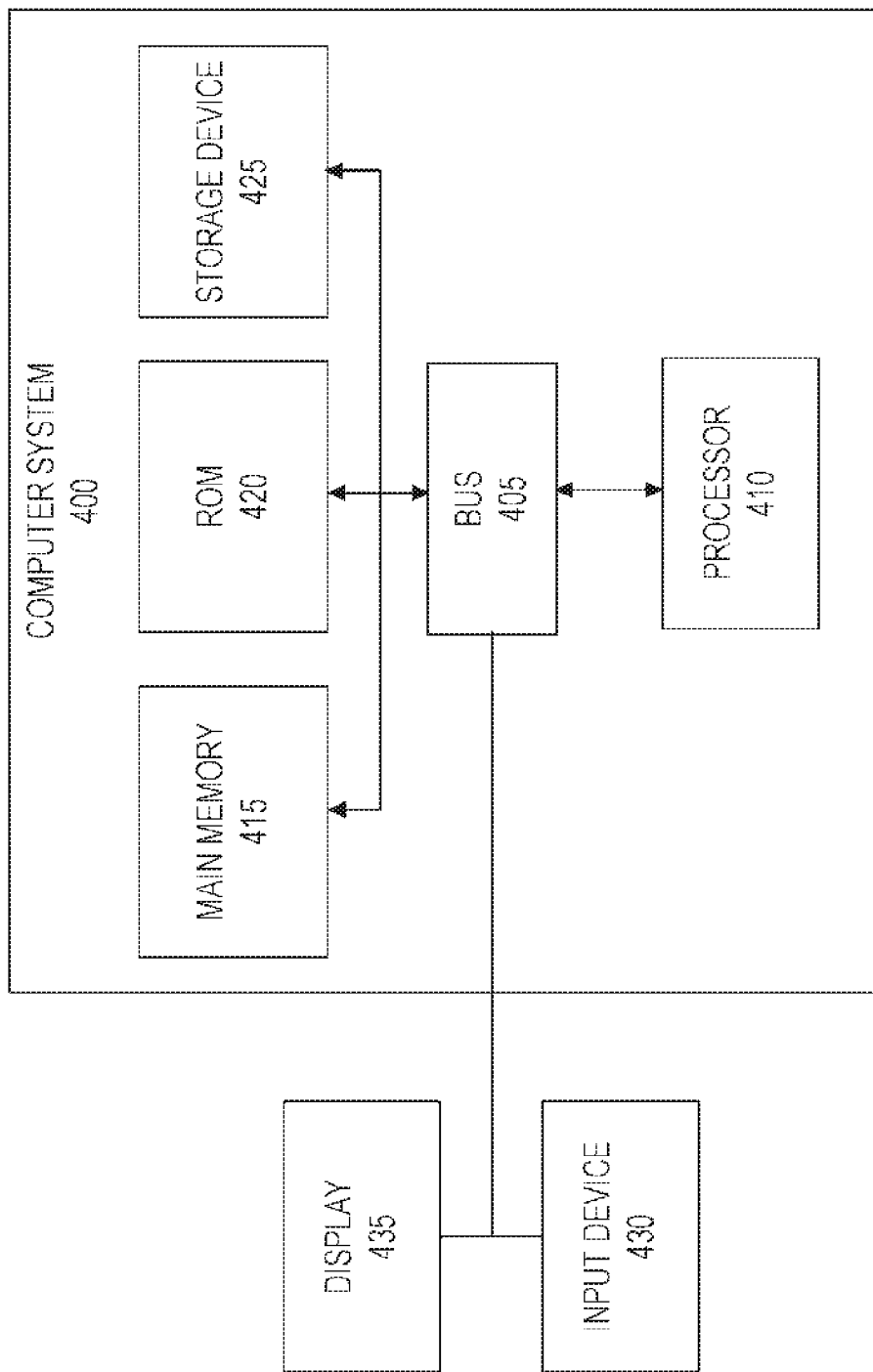
FIG. 4 is a block diagram of an example computer system.

FIG. 4 is a block diagram of an example computer system 400. The computer system or computing device 400 can include or be used to implement the system 100 or its components such as the remote data processing system 102, the vehicle data processing system 140, or the data processing system associated with the mobile client device 150. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 118. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 118.

The computing system 400 may be coupled via the bus 405 to a display 435, such as a liquid crystal display or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 150, the head unit 220 of the vehicle 130, or other components of FIGS. 1 and 2, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415.

Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the remote data processing system 102, the vehicle data processing system 140, or the data processing system associated with the mobile client device 150) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 148). The relationship of client and server arises by virtue of computer programs running on the respective computers and having a client-server relationship to each other. In some implementations, a server transmits data (e.g., data packets representing a content item) to a client mobile device 150 (e.g., for purposes of displaying data to and receiving user input from a user interacting with the client device) or the head unit 220 of the vehicle 130. Data generated at the mobile client device 150 or the vehicle data processing system 140 (e.g., a result of the user interaction) can be received at the server (e.g., received by the data processing system 102 from the mobile client device 150 or the vehicle 130).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 and the validation engine 116 can be a single component, app, or program, or a logic device having one or more processing circuits, or part of one or more servers of the remote data processing system 102 or the vehicle data processing system 140.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A method implemented by one or more processors, the method comprising:
   receiving, from a plurality of sensors installed in a vehicle, a plurality of sensor signals;
   generating, based on one or more the plurality of sensor signals, an occupancy state of the vehicle, the occupancy state of the vehicle representing a mapping of one or more users located inside the vehicle to a plurality of corresponding seats of the vehicle;
   receiving, from a plurality of microphones installed in the vehicle, an audible request to perform a vehicular function that is available via the vehicle;
   identifying, based on the occupancy state of the vehicle, a permission level for a given user, of the one or more users, that provided the audible request, wherein identifying the permission level for the given user that provided the audible request based on the occupancy state of the vehicle comprises identifying a proximal user to a given microphone, of the plurality of microphones, installed in the vehicle;
   determining, based on the permission level for the given user, whether the given user is authorized to cause the vehicular function to be performed; and
   in response to determining the given user is authorized to cause the vehicular function to be performed:
   causing the vehicular function to be performed via the vehicle.

2. The method of claim 1, wherein generating the occupancy state of the vehicle is in response to detecting an entry event into the vehicle.

3. The method of claim 2, wherein detecting the entry event into the vehicle comprises:
   receiving, from the plurality of sensors installed in the vehicle, a plurality of additional sensor signals; and
   determining, based on one or more of the plurality of additional sensors signals, that one or more of the users have entered into the vehicle.

4. The method of claim 1, wherein the permission level for the given user is determined based on the corresponding seat associated with the given user.

5. The method of claim 4, wherein the given user is a driver of the vehicle, and wherein the driver of the vehicle is authorized to cause the vehicular function to be performed.

6. The method of claim 4, wherein the given user is a passenger of the vehicle, and wherein the passenger of the vehicle is not authorized to cause the vehicular function to be performed.

7. The method of claim 1, wherein identifying the permission level for the given user that provided the audible request is further based on acoustic information associated with the audible request.

8. The method of claim 7, wherein the acoustic information associated with the audible request comprises one or more of:
a corresponding amplitude of a plurality of instances of the audible request generated by each of the plurality of microphones; or
a corresponding arrival time of a plurality of instances of the audible request generated by each of the plurality of microphones.

9. The method of claim 8, wherein identifying the permission level for the given user that provided the audible request comprises one or more of:
comparing the corresponding amplitudes of the plurality of instances of the audible request to identify the proximal user as the given user that provided the audible request; or
comparing the corresponding arrival times of the plurality of instances of the audible request to identify the proximal user as the given user that provided the audible request.

10. The method of claim 1, wherein the plurality of sensor signals comprises one or more of:
key fob signals generated by a key fob receiver installed in the vehicle;
seat sensor signals generated by one or more seat sensors installed in the vehicle;
door sensor signals generated by one or more door sensors installed in the vehicle;
motion sensor signals generated by one or more motion sensors installed in the vehicle;
audio input signals generated by one or more of the microphones installed in the vehicle; or
digital image signals generated by one or more cameras installed in the vehicle.

11. The method of claim 1, wherein the permission level for the given user is determined based on a plurality of authentication states associated with the given user.

12. The method of claim 1, further comprising:
in response to determining the given user is not authorized to cause the vehicular function to be performed:
refraining from causing the vehicular function to be performed via the vehicle.

13. A system comprising:
at least one processor; and
memory storing instructions that, when executed, cause the at least one processor to:
receive, from a plurality of sensors installed in a vehicle, a plurality of sensor signals;
generate, based on one or more the plurality of sensor signals, an occupancy state of the vehicle, the occupancy state of the vehicle representing a mapping of one or more users located inside the vehicle to a plurality of corresponding seats of the vehicle;
receive, from a plurality of microphones installed in the vehicle, an audible request to perform a vehicular function that is available via the vehicle;
identify, based on the occupancy state of the vehicle, a permission level for a given user, of the one or more users, that provided the audible request wherein the instructions to identify the permission level for the given user that provided the audible request based on the occupancy state of the vehicle comprise instructions to identify a proximal user to a given microphone, of the plurality of microphones, installed in the vehicle;
determine, based on the permission level for the given user, whether the given user is authorized to cause the vehicular function to be performed; and
in response to determining the given user is authorized to cause the vehicular function to be performed:
cause the vehicular function to be performed via the vehicle.

14. The system of claim 13, wherein the instructions to generate the occupancy state of the vehicle are executed in response to detecting an entry event into the vehicle.

15. The method of claim 14, wherein the instructions to detect the entry event into the vehicle comprise instructions to:
receive, from the plurality of sensors installed in the vehicle, a plurality of additional sensor signals; and
determine, based on one or more of the plurality of additional sensors signals, that one or more of the users have entered into the vehicle.

16. The system of claim 13, wherein the permission level for the given user is determined based on the corresponding seat associated with the given user.

17. The system of claim 16, wherein the given user is a driver of the vehicle, and wherein the driver of the vehicle is authorized to cause the vehicular function to be performed.

18. The system of claim 16, wherein the given user is a passenger of the vehicle, and wherein the passenger of the vehicle is not authorized to cause the vehicular function to be performed.

19. A non-transitory computer-readable storage medium storing instructions that, when executed, cause at least one processor to:
receive, from a plurality of sensors installed in a vehicle, a plurality of sensor signals;
generate, based on one or more the plurality of sensor signals, an occupancy state of the vehicle, the occupancy state of the vehicle representing a mapping of one or more users located inside the vehicle to a plurality of corresponding seats of the vehicle;
receive, from a plurality of microphones installed in the vehicle, an audible request to perform a vehicular function that is available via the vehicle;
identify, based on the occupancy state of the vehicle, a permission level for a given user, of the one or more users, that provided the audible request, wherein identifying the permission level for the given user that provided the audible request based on the occupancy state of the vehicle comprises identifying a proximal user to a given microphone, of the plurality of microphones, installed in the vehicle;
determine, based on the permission level for the given user, whether the given user is authorized to cause the vehicular function to be performed; and
in response to determining the given user is authorized to cause the vehicular function to be performed:
cause the vehicular function to be performed via the vehicle.

* * * * *